United States Patent [19]
Min

[11] Patent Number: 5,320,535
[45] Date of Patent: Jun. 14, 1994

[54] MANNEQUIN HEAD FOR USE IN MAKE-UP PRACTICE AND METHOD OF USE

[76] Inventor: Byueng D. Min, 15/1, 31-2 Samjon-dong, Songpa-gu, Seoul, Rep. of Korea

[21] Appl. No.: 42,663

[22] Filed: Apr. 5, 1993

[51] Int. Cl.⁵ .................................................. G09B 19/00
[52] U.S. Cl. .................................... 434/100; 434/270; 434/377
[58] Field of Search ............... 434/99, 94, 100, 270, 434/271, 377; 446/99, 147, 321, 391; 132/285, 319, 322

[56] References Cited

U.S. PATENT DOCUMENTS

| | | | |
|---|---|---|---|
| 2,309,447 | 1/1943 | Greneker | 446/391 X |
| 3,791,068 | 2/1974 | Pietrowiak | 446/321 |
| 3,851,419 | 12/1974 | Kaelin | 446/321 |
| 4,030,239 | 6/1977 | White et al. | 446/321 |
| 4,596,528 | 6/1986 | Lewis et al. | 434/270 |
| 4,810,196 | 3/1989 | Walker | 434/270 X |
| 5,090,910 | 2/1992 | Narlo | 434/100 X |

FOREIGN PATENT DOCUMENTS

| | | | |
|---|---|---|---|
| 520887 | 2/1931 | Fed. Rep. of Germany | 434/270 |
| 1297337 | 5/1962 | France | 434/100 |
| 930940 | 7/1963 | United Kingdom | 446/231 |

*Primary Examiner*—Gene Mancene
*Assistant Examiner*—Jeffrey A. Smith
*Attorney, Agent, or Firm*—Burns, Doane, Swecker & Mathis

[57] ABSTRACT

A mannequin head for use in make-up practice instead of a human body. The mannequin head has at least one human-face-like face section either on the rear or front surface thereof. With the single mannequin head of this invention, a variety of make-up practice can be done. With this single mannequin of this invention, the make-up practice can be effectively done and a user can have an economical benefits.

9 Claims, 2 Drawing Sheets

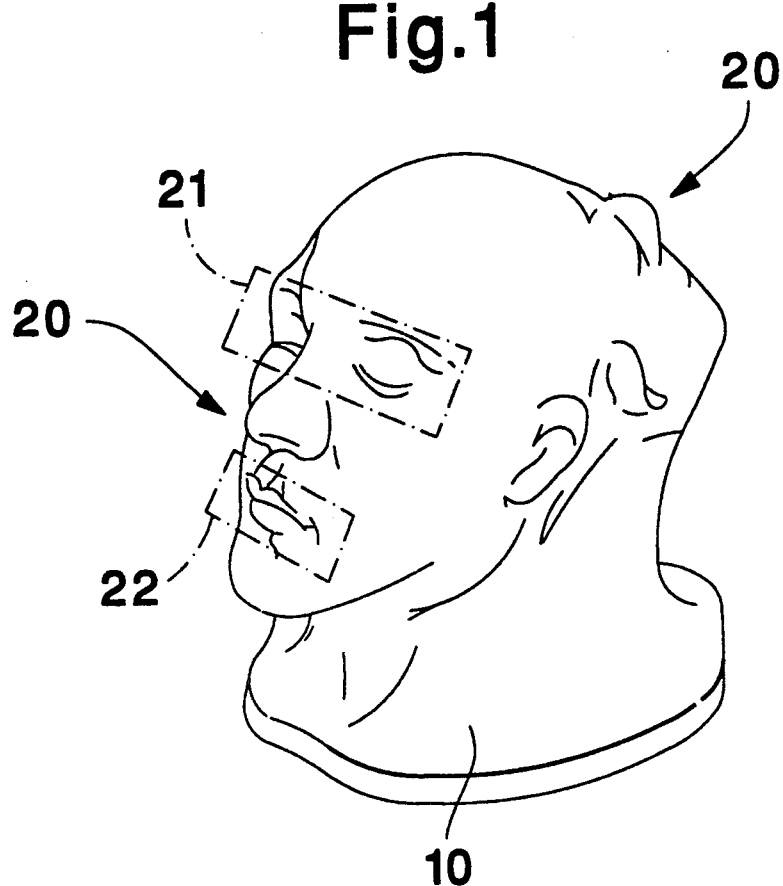
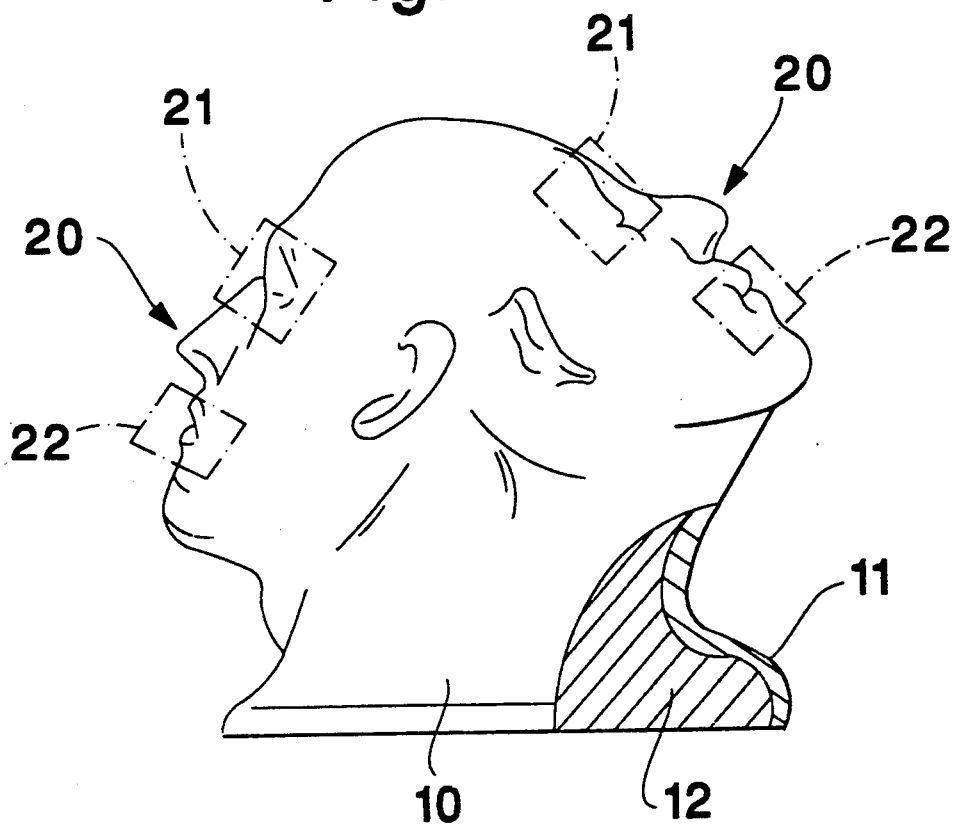

MANNEQUIN HEAD FOR USE IN MAKE-UP PRACTICE AND METHOD OF USE

BACKGROUND OF THE INVENTION

This invention relates to a mannequin head for use in repeated make-up practice, which is used instead of a human body.

Making up eyes and lips symmetrically and balancedly is especially difficult even to a make-up specialist. Consequently, a large amount of repeated practice is required for a make-up specialist as well as an ordinary people.

In many make-up academies, apprentices do eye and lip make-up practice repeatedly to acquire such difficult skill.

Doing make-up practice with a human face is not desirable because of the following reasons.

At first, skin will easily get rough, due to the chemical property of cosmetics. Secondly, it is difficult for a make-up model to maintain a stationary motion for comparatively a long time. Thirdly, it is difficult for a make-up artist to freely move to her desired location.

In view of the above, a mannequin is widely used in such make-up academies.

The conventional mannequin or mannequin head has been used for make-up practice.

Such a mannequin or mannequin head is easy to carry and may be used repeatedly for several times. However, it is monotonous and not efficient.

That is, a make-up for men and women is different. Accordingly, a beauty artist or disguise artist should do a various make-up practice according to the subject people. For example, the kind of make-up varies with the size of eye, and the thickness and length of eyebrow.

With a mannequin of a predetermined shaped lip, various kinds of make-up practice can not be done.

Furthermore, the prior art mannequin having a motonous face should be cleaned whenever the practice is finished, for next practice. The cleaning process requires a large amount of time. Furthermore, it is impossible to compare one make-up face with another one, whereby a make-up skill can not be improved.

Accordingly, for improving the make-up technology with the prior art mannequin, a number of different mannequins have to be purchased, thus increasing expense. Furthermore, it is inconvenient to keep carry the number of the mannequins and a user should bear a heavy burden.

SUMMARY OF THE INVENTION

An object of the present invention is to provide a mannequin head for use in make-up practice having multi-faces, multi-lips or multi-eyes on the circumference thereof.

Another object of the present invention is to provide a mannequin head for use in make-up practice which lightens an economic burden on a user.

BRIEF DESCRIPTION OF THE DRAWINGS

FIG. 1 is a perspective view of a mannequin head for use in make-up practice of the present invention;

FIG. 2 is a front view of a mannequin head for use in make-up practice of the present invention, having a cut-away portion;

DETAILED DESCRIPTION OF THE INVENTION

Figure 3:
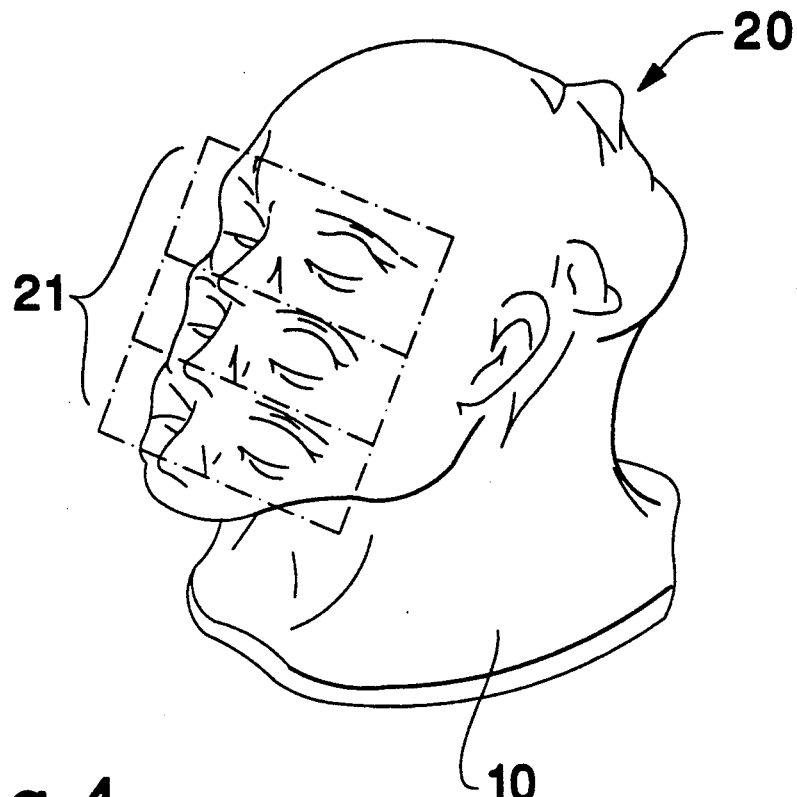
FIG. 3 is a perspective view of another embodiment of the mannequin head for use in make-up practice of the present invention.

Referring to the drawings, a mannequin head 10 of a resinous material has one or more than one face section 20 which is provided either on the rear or front faces thereof, except the front face on the conventional mannequin head.

The mannequin head section 10 has an outer skin face of a layer of urethane resin 11 and an inner filler 12.

Referring particularly to FIGS. 1 and 2, showing one embodiment of the mannequin head 10 of the present invention, the face sections 20 provided on the front and rear faces have different shapes and levels, respectively.

Preferably, the front face section is a female's one and the rear face section is a male's one. With this arrangements, two different make-up practice can be done with only one mannequin head 10. With male's face section, a practice for making up an entertainer as well as an ordinary man is done, i.e., for wearing or removing artificial moustache, eyebrow and scar.

It is within the scope of the present invention that both the two face sections 20 are male's faces or female's faces each of which has different shapes.

FIG. 3 is a second embodiment of the mannequin head 10 of the present invention, wherein the mannequin head 10 has one face section 20 at one face thereof and a plurality of eye sections 21 at the other face thereof. With this arrangements, an eye make-up which is most difficult to do and which requires variety, can be practiced for several times.

The eyes in the respective eye sections 21 have different characteristic according to the eyes of the human body.

In FIG. 3, the eye sections 21 are disposed vertically. However, the eye sections 21 may be disposed zig-zag.

The mannequin head 10 may have only eye sections 21 on the whole circumference thereof for special eye make-up practice.

Consequently, by purchasing a desired mannequin head 10 of the present invention, a repetitive and free make-up practice on the desired face section can be done.

Figure 4:
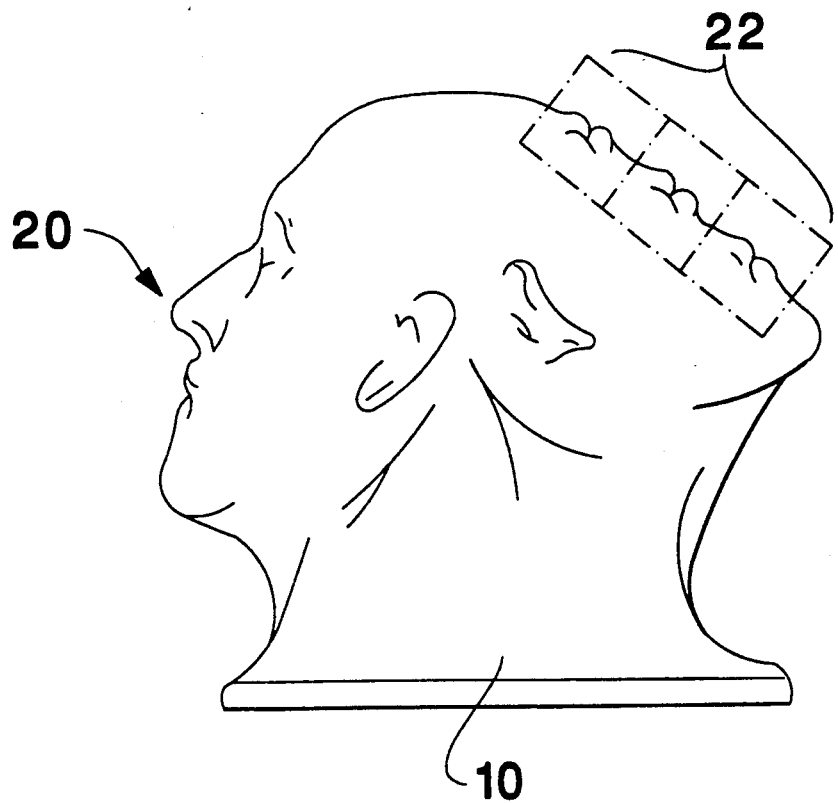
FIG. 4 is a front view of FIG. 3.

FIG. 4 shows a mannequin head 10 having the face section 20 on one face thereof and a plurality of lip sections 22 on the other face thereof for doing combining make-up practice of lips and faces.

In the embodiment of FIG. 4, the mannequin head 10 may have only lip sections 22 on the whole circumference thereof for doing lipstick make-up.

The mannequin head 10 may have three or four face sections on the circumference thereof. However, it is desired that the face sections are disposed in two directions, taking into account appearance of the mannequin head 10.

The mannequin head 10 of this invention can be used for practicing make-up especially by a beauty artist and a disguise artist as well as by an ordinary men. According to this invention, various types of make-ups can be done effectively and rapidly, thus heightening skill acquisition ability. Furthermore, a user wil have an economic benefit by using the mannequin head 10 of the present invention.

What is claimed is:

1. A mannequin head for use in make-up practice, the mannequin head being made of a resinous material and comprising:
   a base portion adapted to rest in a horizontal position and having a first side and a second side;
   a first face section adjacent the first side of the base portion and representing a human face at a first fixed angle from the horizontal, the first fixed angle being such that the first face section faces in a first upward direction for a first make-up;
   a second face section adjacent the second side of the base portion and representing at least a portion of a human face at a second fixed angle from the horizontal, the second fixed angle being such that the second face section faces in a second upward direction for a second make-up, the second upward direction being different from the first upward direction, and
   wherein the first and second face sections are at a vertically disposed distance from each other, and are adapted for at least two different make-ups for the mannequin head.

2. A mannequin head for use in make-up practice according to claim 1, wherein the second face section represents a human face.

3. A mannequin head according to claim 2, wherein the first face section represents a man's face, and the second face section represents a woman's face.

4. A mannequin head according to claim 1, wherein the second face section comprises a plurality of pairs of eye sections.

5. A mannequin head according to claim 4, wherein the pairs of eyes are disposed vertically.

6. A mannequin head according to claim 1, wherein the second face section comprises a plurality of pairs of lip sections.

7. A mannequin head according to claim 6, wherein the plurality of pairs of lip sections are disposed vertically.

8. A mannequin head according to claim 1, wherein the mannequin head has an outer skin of a layer of urethane resin and an inert filler.

9. A method of using the mannequin head of claim 1, which method comprises applying a first make-up to the first face section, and applying a second make-up to the second face section.

* * * * *